March 29, 1966 J. A. SCARONI, JR 3,243,719

A.G.C. CIRCUIT INCLUDING A CONSTANT IMPEDANCE VARIABLE-ATTENUATION NETWORK UTILIZING CURRENT-SENSITIVE IMPEDANCES

Filed Aug. 6, 1963

INVENTOR.
Joseph A. Scaroni Jr.
BY
ATTY.

3,243,719

A.G.C. CIRCUIT INCLUDING A CONSTANT IMPEDANCE VARIABLE-ATTENUATION NETWORK UTILIZING CURRENT-SENSITIVE IMPEDANCES

Joseph A. Scaroni, Jr., Menlo Park, Calif., assignor, by mesne assignments, to Automatic Electric Laboratories, Inc., North Lake, Ill., a corporation of Delaware Filed Aug. 6, 1963, Ser. No. 300,253
5 Claims. (Cl. 330—29)

This invention relates to an amplifying system and more particularly relates to gain control circuits used with such a system. More specifically the invention pertains to an automatic gain control circuit which includes a varying D.C. voltage circuit and a current sensitive impedance network.

When transistors are used as intermediate frequency amplifiers for radio systems it is necessary to control gain to compensate for variations in path loss. A method which is commonly used is an automatic gain control circuit which achieves gain stability by varying one bias point through a feedback arrangement that compensates for changes in two or more transistors. At high frequencies in the range of the intermediate or microwave frequencies, this method is not an adequate means for gain compensation since a change in transistor bias causes a corresponding change in the transistor's input and output impedance which has an undesirable effect upon amplifier frequency response.

Another method for automatic gain control is the variable loss network which compensates for gain variations without changing the bias point of the transistor amplifier. A type of variable loss network is the bridged-T electronically-controlled attenuator network which has current sensitive impedance devices in the series and shunt parts of said bridged-T network, and is described in the September 1961 Demodulator, a Lenkurt Electric Co. publication. A feature of this arrangement is that over a wide resistive range, the series and shunt impedance variable device may be varied inversely to each other without substantially changing the input and output impedance of the network. In order to use this constant impedance feature to compensate for amplifier gain variations, two bias voltages derived from the same source are necessary; one to control the series variable device and the other to control the shunt variable device. The limitations of this arrangement is that the bias voltages which generate currents that determine the impedance of the variable impedance devices may drift and thereby cause the variable loss network to give an incorrect voltage compensation.

Therefore, it is an object of this invention to provide current to a variable loss network, particularly the constant-impedance type, that accurately represents changes in amplifier gain, so that a constant signal voltage output level will be maintained.

It is a further object of this invention to provide a means for sampling the output of amplifiers, such as intermediate frequency amplifiers, and providing currents which will control the loss of bridged-T electronically-controlled attenuator networks.

In the embodiment of the invention described hereinafter, control currents are provided to a variable-loss constant-impedance network which accurately represent changes in amplifier gain in connection with intermediate frequency amplifiers, but it is to be understood that the invention applies to amplifiers of all types where a constant output level is desired.

Other objects and a fuller understanding of the invention may be had by referring to the following description, taken in conjunction with the accompanying drawings in which.

Figure 1:
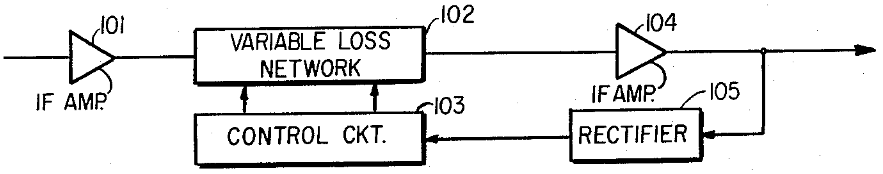
FIG. 1 is a block diagram of an automatic control system according to the invention as it is used in the environment of an intermediate frequency amplifier of a microwave system.

With reference to FIGURE 1, the block diagram illustrates the invention as being incorporated in an IF amplifier system. An IF signal is amplified through a first amplifier 101 and passes through variable-loss network 102 which is connected between the first amplifier 101 and the second amplifier 104. A sampling of the output of the second IF amplifier 104 is converted into a D.C. voltage by a rectifying network 105. Said D.C. voltage varies with the signal strength at the output of amplifier 104 and is injected into the input of the control circuit 103. The control circuit 103 has two outputs which vary the series and shunt parts respectively of the variable-loss network 102 in order to compensate for level changes at the output of amplifier 104. The variable-loss network 102 may include a single or a plurality of bridged-T variable-loss sections.

Figure 2:
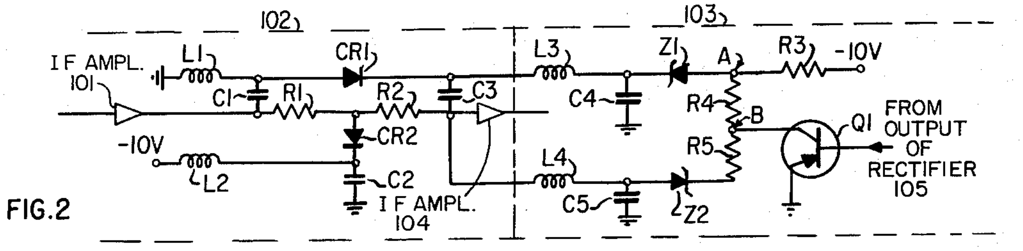
FIG. 2 is a schematic diagram of the automatic gain control system, including a variable-loss network and a control circuit.

FIGURE 2 illustrates the details of the automatic gain control network consisting of the variable-loss attenuator 102 and control circuit 103. The variable-loss network 102 is in a bridged-T arrangement which is comprised of resistor R1, R2, and variable-impedance devices, diodes CR1 and CR2. The bridged-T network has a series part, R1, R2, and CR1, and a shunt part CR2. Capacitors C1, C2, and C3 block D.C. and pass signal voltage and do not effect network impedance.

The control circuit 103 includes a D.C. amplifier Q1, a D.C. input voltage at the base of transistor Q1, and an output circuit. Said output circuit consists of two parts; resistor R3 and zener diode Z1 comprising one part and resistor R5 and zener diode Z2 the other part. R4 is a voltage-dropping resistor whose value is the required resistance necessary to allow a designated equal value of current to flow in both output sections of said output circuit. Capacitors C4 and C5 are signal bypass capacitors to ground, or to the low potential reference point and inductors L1, L2, L3 and L4 serve as a low resistive D.C. path while being a high impedance to signal voltages.

Referring to FIG. 2, the operation of the automatic gain control circuit is as follows. A D.C. voltage obtained by rectifying a sampling of the output voltage of IF amplifier 104 is fed into D.C. amplifier Q1. When IF voltage is decreasing, said D.C. voltage will vary toward the cutoff point of Q1; the output potential of Q1 will become more negative and thereby causing an increased current flow through Z1 and CR1 and less current through R5, Z2 and CR2. When current is increasing through CR1 and decreasing through CR2, the IF signal loss through the variable loss network 102 will be decreasing. Minimum IF signal loss through the variable loss network 102 will occur when Q1 is cut off.

When said output IF voltage is increasing, said D.C. voltage level will vary in the saturation direction of transistor Q1; the output potential of Q1 will become less negative and thereby cause an increased current flow through R5, Z2 and CR2, and less current through Z1 and CR1. When current is increasing through CR2 and decreasing through CR1 and IF signal loss through the variable-loss network 102 will be increasing. Maximum IF signal loss through the variable loss network 102 will occur when Q1 is saturated.

In order to properly compensate for undesirable IF signal variations, the automatic grain control circuit must be free of internal drift. Drift-free operation of said automatic gain circuit is obtained by using zener diodes as voltage dropping elements, and thereby utilizing their wide temperature stability range.

Figure 3:
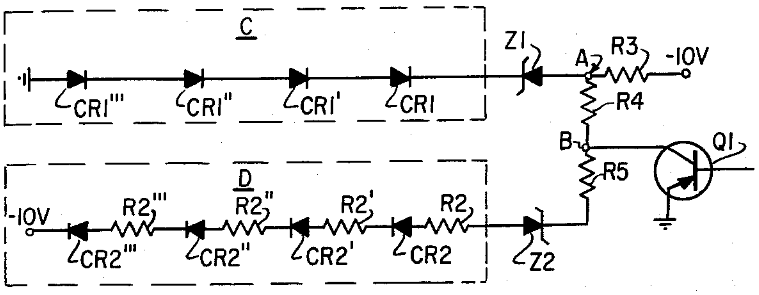
FIG. 3 is a direct current equivalent circuit of the automatic gain control system.

Referring to FIG. 3, the determination of circuit values for a configuration utilizing the features of this invention will be described. Illustrated in said FIG. 3 is a D.C. equivalent circuit of this invention using four variable-loss bridged-T sections in series with respect to D.C. currents. Note in FIG. 4 that a schematic of two variable-loss bridged-T sections are shown in series.

Diode 1N277 is used as the resistance variable element and has the following characteristics:

| Current | Voltage Drop | R at 70 mc. |
|---|---|---|
| 5.0 ma. | .4 v. | 17 ohm |
| 1.5 ma. | .3 v. | 75 ohm |
| 0.1 ma. | .1 v. | 350 ohm |

Zener diodes having the following voltage-current relationship were selected:

| Current | Zener Z1—4.3 v. | Zener Z2—5.6 v. |
|---|---|---|
| 5.0 ma. | 4.3 v. | 5.6 v. |
| 1.5 ma. | 3.8 v. | 5.3 v. |
| 0.1 ma. | 3.5 v. | 4.5 v. |

With regard for the above characteristics, the circuit values were obtained as follows.

(1) R3—R3 is the resistance necessary to give a maximum current of 5 ma. through section C when transistor Q1 is at cutoff. When Q1 is off no current will be flowing through section D.

$$10\text{ v.}=5\text{ ma.}\times R3+\text{zener }(4.3\text{ v.})+\text{diodes }(4\times 0.4\text{ v.})$$

$$R3=\frac{4.1\text{ v.}}{5\text{ ma.}}=820\text{ ohms.}$$

(2) Z2—The voltage of Z2 is the value necessary to prevent current from flowing through section D when Q1 is cutoff and the current through section C is at its 5 ma. maximum. Under this condition the voltage at point A and B will be equal:

$$5\text{ ma.}\times 820=4.1\text{ volts from }-10\text{ v.}$$

Since the breakdown voltage for each diode is 0.1 volt the breakdown voltage of Z2 must be approximately:

$$4.1-4(0.1)=3.7\text{ v.}$$

To insure that the voltage will be cutoff, a zener with a breakdown voltage above 3.7 volts was chosen. A safety margin was obtained by choosing a 5.6 v. zener diode which has a 4.5-volt drop at 0.1 ma. of current.

(3) R5—R5 is the resistance necessary to give a maximum current of 5 ma. through section D when Q1 is saturated.

$$10\text{ v.}=5\text{ ma.}\ (4R2+R5)+\text{zener voltage }5.6\text{ v.}+\text{diode voltage }4(0.4\text{ v.})$$

$$4R2+R5=\frac{2.8\text{ v.}}{5\text{ ma.}}=560\text{ ohms}$$

$$R5=560\text{ ohms}-4\times 75\text{ ohms}=260\text{ ohms}$$

(4) R4—R4 is the resistance required when 1.5 ma. flows in section C and section D. Under this condition the voltages at A and B are as follows:

$$VA=\text{diode voltage drop }4(-0.3\text{ v.})-\text{zener voltage }3.8\text{ v.}=-5.0\text{ v.}$$

$$VB=(1.5\text{ ma.}\times 560\text{ ohms})+(4\times 0.3\text{ v.})+5.3\text{ v.}-10\text{ v.}=-2.7\text{ v.}$$

$$VB-VA=-2.7\text{ v.}-(-5.0\text{ v.})=2.3\text{ v.}$$

The current through R3 to give a voltage of −5.0 v. is 6.1 ma.

The current through R4 is:

$$6.1\text{ ma.}-1.5\text{ ma.}=4.6\text{ ma.}$$

$$R4=\frac{2.3\text{ v.}}{4.6\text{ ma.}}=500\text{ ohms}$$

Figure 4:
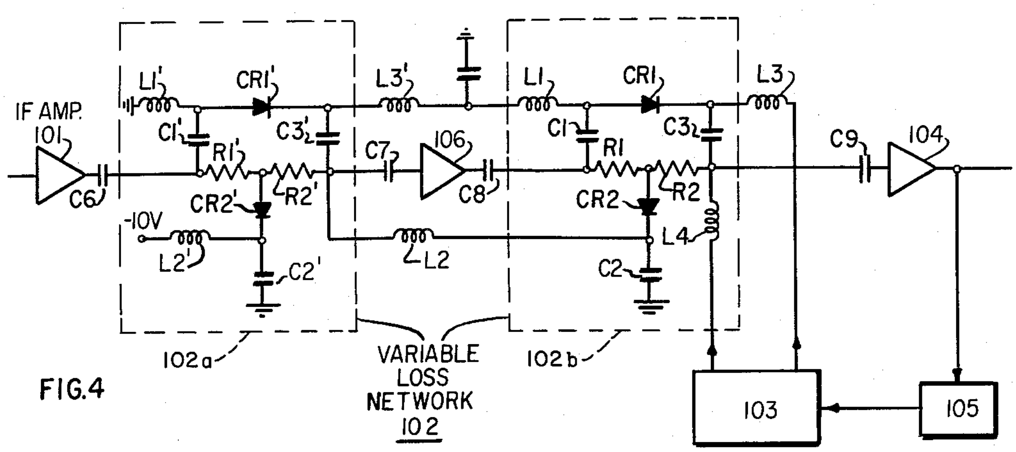
FIG. 4 is a schematic of a variable-loss network comprised of two bridge-T sections connected with regard to direct current in series, as it is used in the environment of an automatic gain control circuit in an intermediate frequency amplifier of a microwave system.

FIGURE 4 is a schematic of a variable-loss network comprised of two variable-loss bridged-T sections connected in series with respect to direct current. One section **102*a* is interposed between amplifiers 101 and 106, and another bridged-T section 102*b* is interposed between amplifiers 106 and 104**.

One control circuit 103 controls the D.C. current flowing through both bridged-T sections and thereby regulating the signal voltage through amplifiers 106 and 104. The operation of the gain control circuit 103 is substantially the same whether the variable-loss network 102 is comprised of a single or a plurality of bridged-T sections, and therefore the explanation given with reference to FIG. 2 and FIG. 3 would be applicable. C6, C7, C8, C9, which are not included in FIG. 2 and FIG. 3 are signal coupling capacitors.

While the present invention has been described with respect to a particular embodiment, this description is intended in no way to limit the scope of the invention.

What is claimed is:

1. An automatic-gain-control circuit comprising an amplifier, a T-section variable-loss network having a series circuit and a shunt circuit, connections for applying a signal through said variable-loss network to the input of said amplifier, each of said circuits of said variable-loss network including an impedance control device whose impedance varies inversely with the flow of direct current therethrough, each of said circuits of said variable-loss network also having a direct-current control part for controlling the impedance of said respective impedance control device, each of said direct-current control parts including a constant voltage element connected in series with the respective one of said control devices, a source of direct-current voltage, a voltage divider, said direct-current control part for said series circuit, said voltage divider and said direct-current control part for said shunt circuit being connected successively in series between the terminals of said direct-current source, said voltage divider having an intermediate tap, said constant voltage element determining the level to which the voltage that is applied to a respective one of said direct-current control parts must rise before substantial current flows therein to control the impedance of the respective one of said impedance control devices, and a detector and voltage control circuit connected successively between the output of said amplifier and said intermediate tap of said voltage divider to control the direct-current voltage at said intermediate tap, the impedances of said series circuit and said shunt circuit changing inversely in response to change in voltage at said intermediate tap, thereby regulating the output of said amplifier.

2. An automatic-gain-control circuit comprising first and second amplifiers, a T-section variable-loss network having a series circuit and a shunt circuit, the output of said first amplifier being connected through said variable-loss network to the input of said second amplifier, each of said circuits of said variable-loss network including a control diode that has an impedance that varies inversely with the flow of direct current therethrough, each of said circuits of said variable-loss network also having a direct-current control part for controlling the impedance of said respective control diode, each of said direct-current control parts including an isolating impedance element and a zener diode connected in series with the respective one of said control diodes, a source of direct-current voltage, a voltage divider, said direct-current control part for said series circuit, said voltage divider and said direct-current control part for said shunt circuit being connected successively in series between the terminals of said direct-current source, said voltage divider having an intermediate tap, said zener diodes determining the level to which the voltage that is applied to a respective one of said direct-current control parts must rise before substantial current flows therein to control the impedance of the respective one of said control diodes, and a detector and a voltage control circuit connected successively between the output of said second amplifier and said intermediate tap of said voltage divider to control the direct-current voltage at said intermediate tap, the impedances of said series circuit and said shunt circuit changing inversely in response to change in voltage at said intermediate tap, thereby, regulating the output of said second amplifier.

3. An automatic gain control circuit comprising a variable-loss network and an amplifier, said variable-loss network having a series branch and a shunt branch, the output of said variable-loss network being connected to the input of said amplifier, means for applying signal through said series branch to the input of said amplifier, a variable-impedance device in each of said branches, each of said variable-impedance devices changing impedance in response to change in flow of direct current therethrough, a first direct-current impedance control circuit for said series branch, a second direct-current impedance control circuit for said shunt branch, each of said direct-current impedance control circuits including the respective one of said variable impedance devices and a series signal isolating impedance, a constant-voltage device connected in series in each of said direct-current impedance control circuits, each of said constant voltage devices providing a constant bias for the respective direct-current impedance control circuit as a reference for maintaining the level of output of said amplifier substantially constant for normal levels of signal, a detector having its input connected to the output of said amplifier, a bias voltage circuit having an input connected to the output of said detector, said bias voltage circuit having first and second output circuits, said bias voltage circuit being responsive to a predetermined output of said amplifier to provide normal operating voltages at said first and second output circuits, said first direct-current impedance control circuit being connected to said first output circuit, said second direct-current impedance control circuit being connected to said second output circuit, said normal operating voltage at each of said first and second output circuits being enough higher than the constant voltage drop across said constant voltage device in the respective direct-current impedance control circuit to cause sufficient current flow therein to operate said respective variable impedance device at a point intermediate its full range of impedance values, and said direct-current impedance control circuit responding to a departure in level of signal at the output of said amplifier from said predetermined output to vary the voltages at said first and second output circuits inversely, thereby, to vary the impedances of said shunt branch and said series branch inversely for maintaining the input impedance and the output voltage of said amplifier substantially constant.

4. An automatic-gain-control circuit comprising:

an amplifier, an attenuator network of the type having a series alternating-current circuit and a shunt alternating -current circuit, said series circuit and said shunt circuit having a first variable impedance element and a second variable impedance element respectively, the impedance of each of said impedance elements being dependent upon the amount of direct current flowing therethrough, the output of said attenuator being connected to the input of said amplifier, means for applying signal through said series circuit of said attenuator to the input of said amplifier, a detector having its input connected to the output circuit of said amplifier for deriving at the output of said detector a direct-current voltage proportional to the amplitude of the signal that is applied to the input of said amplifier, a source of direct current, a first direct-current control circuit including said first variable impedance element of said series alternating-current control circuit, a second direct-current control circuit including said second variable impedance of said shunt alternating-current control circuit, each of said direct-current circuits including serially connected impedance means for isolating said respective alternating-current control circuits, one terminal of each of said direct-current circuits being connected to said direct-current source, said one terminals being connected to different terminals of said direct-source for applying different potentials thereto, a first constant-voltage element connected in series in said first direct-current control circuit, a second constant-voltage element connected in series in said second direct-current control circuit, a voltage divider connected between the other terminals of said first and second direct-current control circuits, a bias voltage-control circuit connected between the output of said detector and said voltage divider, said bias voltage-control circuit being responsive to change in the output level of said amplifier to change the potential applied to said voltage divider so that the voltages applied to said first and to said second direct-current control circuits varies inversely, and each of said constant-voltage elements determining the level to which the voltage must rise in said respective direct-current control circuit to cause substantial change of impedance in said respective alternating-current circuit.

5. An automatic-gain-control circuit as claimed in claim 4 in which said constant voltage elements are zener diodes.

(References on following page)

References Cited by the Examiner

UNITED STATES PATENTS

| | | | |
|---|---|---|---|
| 2,971,164 | 2/1961 | Saari | 330—145 |
| 3,090,927 | 5/1963 | Minner | 330—29 |
| 3,153,189 | 10/1964 | Sweeney | 330—145 X |

OTHER REFERENCES

Shaughnessy: "The Zener Diode," Popular Electronics, June 1961, pp. 76–82 (pp. 79–82 relied on).

ROY LAKE, *Primary Examiner*.

R. P. KANANEN, *Assistant Examiner*.